(12) United States Patent
Oishi (10) Patent No.: US 8,218,626 B2
(45) Date of Patent: Jul. 10, 2012

(54) ENCODING CONTROL APPARATUS, ENCODING CONTROL METHOD, AND STORAGE MEDIUM

(75) Inventor: Akihiro Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1046 days.

(21) Appl. No.: 12/129,581

(22) Filed: May 29, 2008

(65) Prior Publication Data

US 2008/0298465 A1 Dec. 4, 2008

(30) Foreign Application Priority Data

May 31, 2007 (JP) ................................. 2007-145449

(51) Int. Cl.
*H04N 7/12* (2006.01)
(52) U.S. Cl. ......... 375/240.03; 375/240.05; 375/240.13; 375/240.07; 375/240.12
(58) Field of Classification Search ............. 375/240.24, 375/240.1, 240.11, 240.12, 240.16, 240.03, 375/240.05, 240.13, 240.07
See application file for complete search history.

(56) References Cited

U.S. PATENT DOCUMENTS

| | | | | |
|---|---|---|---|---|
| 6,091,460 A * | 7/2000 | Hatano et al. ................. | 348/699 |
| 6,385,345 B1 * | 5/2002 | Ribas-Corbera et al. ..... | 382/239 |
| 6,944,224 B2 * | 9/2005 | Zhao et al. ............... | 375/240.16 |
| 7,280,597 B2 * | 10/2007 | Zhang et al. ............. | 375/240.16 |
| 7,643,559 B2 * | 1/2010 | Kato et al. ................ | 375/240.23 |
| 7,936,816 B2 * | 5/2011 | Sostawa et al. ........... | 375/240.03 |
| 2003/0053543 A1 * | 3/2003 | Bhaumik et al. ......... | 375/240.16 |
| 2005/0123038 A1 * | 6/2005 | Otsuka et al. ............. | 375/240.03 |

FOREIGN PATENT DOCUMENTS

JP  9-37268 A  2/1997

* cited by examiner

*Primary Examiner* — Ricky Ngo
*Assistant Examiner* — DeWanda Samuel
(74) *Attorney, Agent, or Firm* — Canon USA, Inc., IP Division (57) ABSTRACT

An encoding control apparatus is disclosed that includes a variance calculation unit configured to calculate a variance of an encoding target macroblock; a sum-of-absolute-difference calculation unit configured to calculate a sum of absolute differences between the encoding target macroblock and a reference macroblock; a setting unit configured to set, based on the variance and the sum of absolute differences, a standard for determining whether to skip encoding of the encoding target macroblock; a prediction unit configured to perform motion compensation prediction on the encoding target macroblock to obtain a motion-compensated prediction value; and a determination unit configured to determine whether to skip encoding of the encoding target macroblock by comparing the motion-compensated prediction value with the standard. Related apparatuses and methods are also disclosed.

8 Claims, 7 Drawing Sheets

ENCODING CONTROL APPARATUS, ENCODING CONTROL METHOD, AND STORAGE MEDIUM

CROSS-REFERENCE TO RELATED APPLICATIONS

This application claims the benefit of Japanese Patent Application No. 2007-145449 filed on May 31, 2007, which is hereby incorporated by reference herein in its entirety.

BACKGROUND OF THE INVENTION

1. Field of the Invention

The present invention relates to an encoding control apparatus configured to encode a moving image.

2. Description of the Related Art

MPEG (Moving Picture Experts Group) standards are known as moving image compression encoding standards. An encoding apparatus for encoding a moving image to generate MPEG compatible data is adapted to determine a target amount of code for each picture on the basis of a target data rate. Based on the target amount of code for each picture, target amounts of code are averagely assigned to all macroblocks constituting each picture. Then, a quantization step by which each macroblock is encoded is determined so as to obtain the target amount of code, and the macroblocks are encoded.

One method to reduce the amount of code of a moving image is to skip some macroblocks as macroblocks that need not be encoded. For example, Japanese Patent Laid-Open No. 9-37268 discloses a method of determining a macroblock whose encoding is to be skipped on the basis of motion vector information, the maximum of absolute values of elements, and the sum of the absolute values.

However, this method has a problem. In a case where blocks surrounding a macroblock to be encoded are generally low-frequency blocks and the entire content of an image moves (due to panning, tilting, or the like), the macroblock to be encoded may be skipped if the difference between the macroblock to be encoded and a reference macroblock is small. Such skipping results from the presumption, made to minimize the amount of code, that the encoding target macroblock is equal to a macroblock located at a corresponding position in a reference frame. As a result, a macroblock remains unchanged between successive output frames, resulting in an unnatural looking image.

SUMMARY OF THE INVENTION

The present invention reduces the occurrence of creation of an unnatural looking image due to the presence of a macroblock that remains unchanged between frames, which is caused by skipping of encoding of a low-frequency macroblock. A macroblock whose encoding is to be skipped may be referred to as a "skip macroblock".

The present invention provides an encoding control apparatus including a variance calculation unit configured to calculate a variance of an encoding target macroblock; a sum-of-absolute-difference calculation unit configured to calculate a sum of absolute differences between the encoding target macroblock and a reference macroblock; a setting unit configured to set, based on the variance and the sum of absolute differences, a standard for determining whether to skip encoding of the encoding target macroblock; a prediction unit configured to perform motion compensation prediction on the encoding target macroblock to obtain a motion-compensated prediction value; and a determination unit configured to determine whether to skip encoding of the encoding target macroblock by comparing the motion-compensated prediction value with the standard.

According to the present invention, the occurrence of an unnatural look in an image due to the presence of a macroblock that remains unchanged between successive output frames, the unnatural look caused by skipping of encoding of a low-frequency macroblock, can be reduced.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present invention and, together with the description, explain the principles of the present invention.

DESCRIPTION OF THE EMBODIMENTS

First Embodiment

A first embodiment of the present invention is described next with reference to the drawings.

Figure 1:
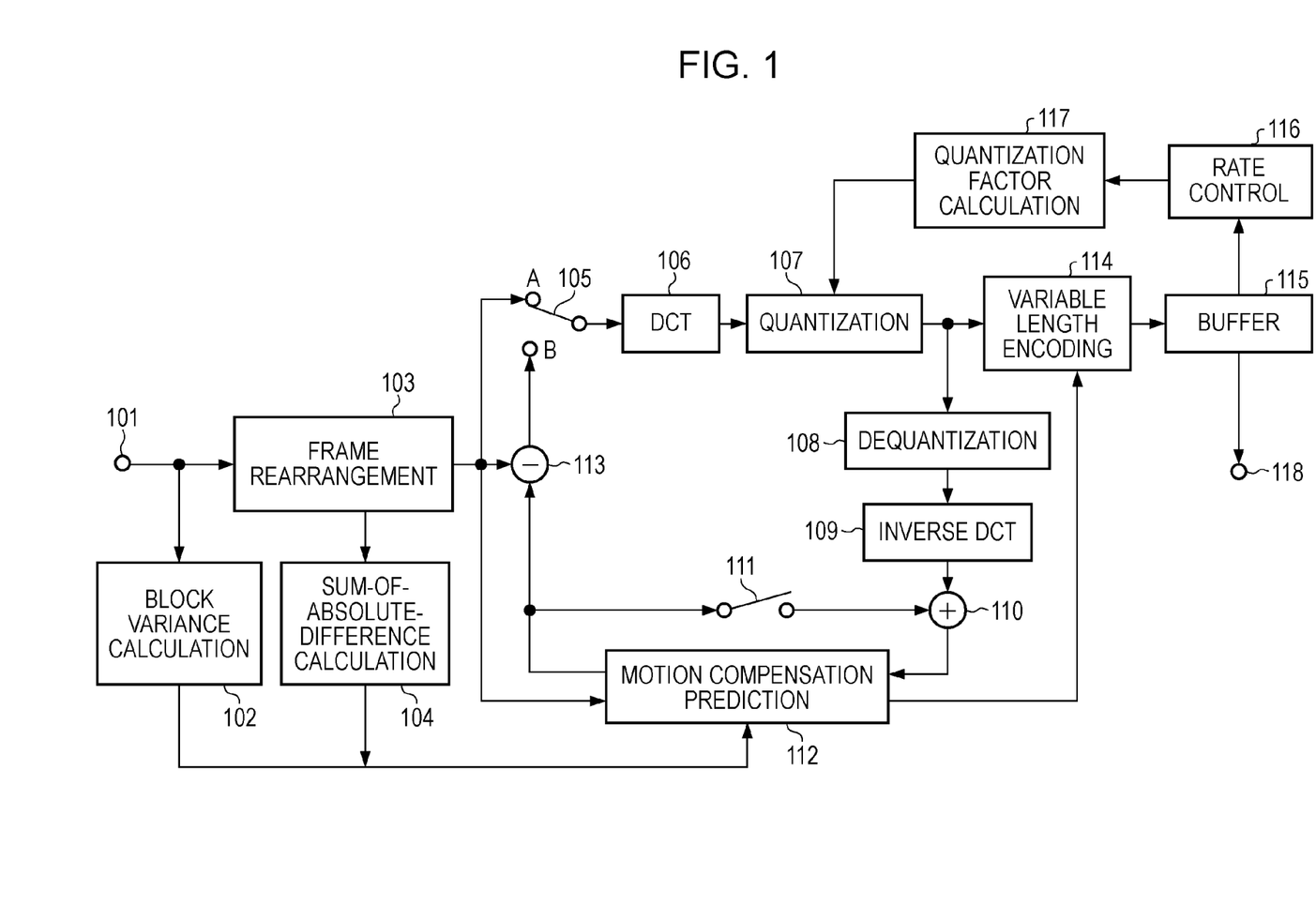
FIG. 1 is a schematic block diagram of an apparatus according to a first embodiment of the present invention.

FIG. 1 is a schematic block diagram of a coding apparatus according to the first embodiment of the present invention. The coding apparatus includes an input terminal 101 to which image data is input, a block variance calculation circuit 102 configured to calculate a variance for each macroblock of the image data supplied from the input terminal 101, and a frame rearrangement circuit 103 configured to rearrange in predetermined order the image data supplied from the input terminal 101 in picture (frame or field) units. The coding apparatus further includes a sum-of-absolute-difference calculation circuit 104 configured to calculate a sum of absolute differences for the image data on a macroblock-by-macroblock basis, a subtractor 113 configured to subtract a motion-compensated prediction value from image data output from the frame rearrangement circuit 103, and a switch 105 operable to select an output of the frame rearrangement circuit 103 or an output of the subtractor 113. The coding apparatus further includes a discrete cosine transform (DCT) circuit 106 configured to perform a DCT on the data selected by the switch 105, and a quantization circuit 107 configured to quantize transform coefficient data output from the DCT circuit 106.

The coding apparatus further includes a dequantization circuit 108 configured to dequantize data output from the quantization circuit 107, an inverse DCT circuit 109 configured to perform an inverse DCT on an output of the dequantization circuit 108, and an adder 110 configured to output data output from the inverse DCT circuit 109 for intra-frame encoding and to add the motion-compensated prediction value to the data output from the inverse DCT circuit 109 for inter-frame predictive encoding. The coding apparatus further includes a motion compensation prediction circuit 112 configured to calculate the motion-compensated prediction value from an output of the adder 110 and the image data output from the frame rearrangement circuit 103. The prediction value output from the motion compensation prediction circuit 112 is supplied to the subtractor 113 and is also selectively supplied through a switch 111 to the adder 110. The switch 111 is opened for intra-frame encoding and is closed for inter-frame predictive encoding.

The apparatus further includes a variable length encoding circuit 114 configured to variable-length encode the data output from the quantization circuit 107 and to output the variable-length encoded data together with motion vector information obtained from the motion compensation prediction circuit 112. The apparatus further includes a buffer 115 configured to temporarily store the data output from the variable length encoding circuit 114 and to provide rate adjustment. The apparatus further includes a rate control circuit 116 configured to control an encoding data rate by adjusting a quantization step size for the quantization circuit 107 according to a level of data stored in the buffer 115, a quantization factor calculation unit 117 configured to determine a quantization factor on the basis of an output of the rate control circuit 116, and an output terminal 118 from which encoded image data is output.

The operation of the apparatus of the first embodiment will be described with reference to FIG. 1.

An image input from the input terminal 101 is input to the block variance calculation circuit 102. The block variance calculation circuit 102 calculates a variance of image data from the input terminal 101 for each macroblock. The variance calculated for each macroblock by the block variance calculation circuit 102 is supplied to the motion compensation prediction circuit 112.

Figure 7:
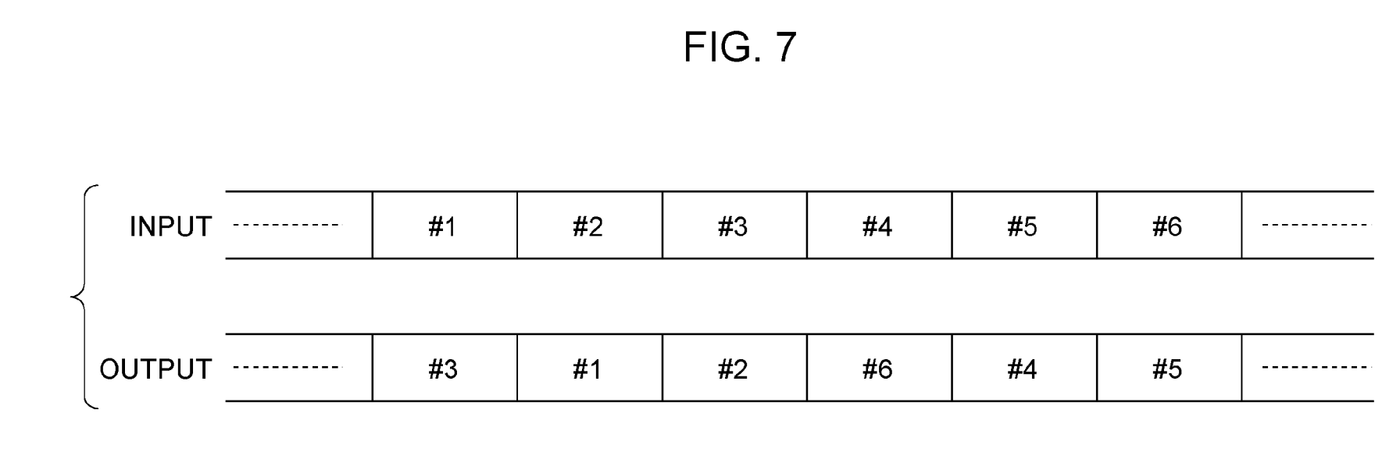
FIG. 7 is a diagram showing an example of rearrangement of frames by using a frame rearrangement circuit.

The frame rearrangement circuit 103 rearranges the image data from the input terminal 101 into an order shown in FIG. 7. The frame rearrangement circuit 103 supplies the rearranged image data to the subtracter 113, to a contact A of the switch 105, and to the motion compensation prediction circuit 112. FIG. 7 schematically shows a rearrangement rule used in the frame rearrangement circuit 103. Every three frames are grouped into a unit, and the last frame is moved to the beginning of the unit so that it is followed by the first and second frames. The frame rearrangement circuit 103 rearranges image data that is input in the order of, for example, frames #1, #2, and #3 into the order of frames #3, #1, and #2, and outputs the rearranged image data.

Then, the sum-of-absolute-difference calculation circuit 104 calculates a sum of absolute differences of luminance signals of macroblocks at corresponding positions between a reference picture (reference frame) and a picture to be encoded on a macroblock-by-macroblock basis. The sum-of absolute-difference calculation circuit 104 supplies the results to the motion compensation prediction circuit 112.

At a timing of intra-frame encoding (I-picture) of the image data output from the frame rearrangement circuit 103, the switch 105 is connected to the contact A side, and the image data output from the frame rearrangement circuit 103 is supplied to the DCT circuit 106. At a timing of inter-frame predictive encoding (P-picture) or bi-directionally predictive encoding (B-picture) of the image data output from the frame rearrangement circuit 103, the switch 105 is connected to a contact B side, and the output of the subtractor 113 is supplied to the DCT circuit 106.

The DCT circuit 106 performs a DCT on the input data, and the quantization circuit 107 quantizes the data (transform coefficient data) output from the DCT circuit 106 with a quantization step size specified by the quantization factor calculation unit 117. The dequantization circuit 108 dequantizes the data output from the quantization circuit 107, and the inverse DCT circuit 109 performs an inverse DCT on an output of the dequantization circuit 108. An output of the inverse DCT circuit 109 corresponds to the data input to the DCT circuit 106.

In the case of I-pictures, since decoded image data is output from the inverse DCT circuit 109, the switch 111 is opened and the adder 110 supplies the output data of the inverse DCT circuit 109 to the motion compensation prediction circuit 112.

In the case of P-pictures or B-pictures, the switch 111 is closed, and the adder 110 adds the prediction value output from the motion compensation prediction circuit 112 to the output data of the inverse DCT circuit 109. Data output from the adder 110 is locally decoded image data, which is supplied to the motion compensation prediction circuit 112.

The operation of the motion compensation prediction circuit 112 is described in detail below.

The variable length encoding circuit 114 variable-length encodes the data output from the quantization circuit 107 and outputs the encoded data and motion vector information obtained from the motion compensation prediction circuit 112 to the buffer 115. The buffer 115 adjusts the rate of the data from the variable length encoding circuit 114 and supplies the rate-adjusted data to the output terminal 118. The buffer 115 also supplies information concerning the amount of code of the data to the rate control circuit 116. The quantization factor calculation unit 117 adjusts the quantization step size for the quantization circuit 107 so that the amount of code of the data can be in a desired range within the buffer 115, for example, so that the buffer 115 may not overflow.

Figure 3:
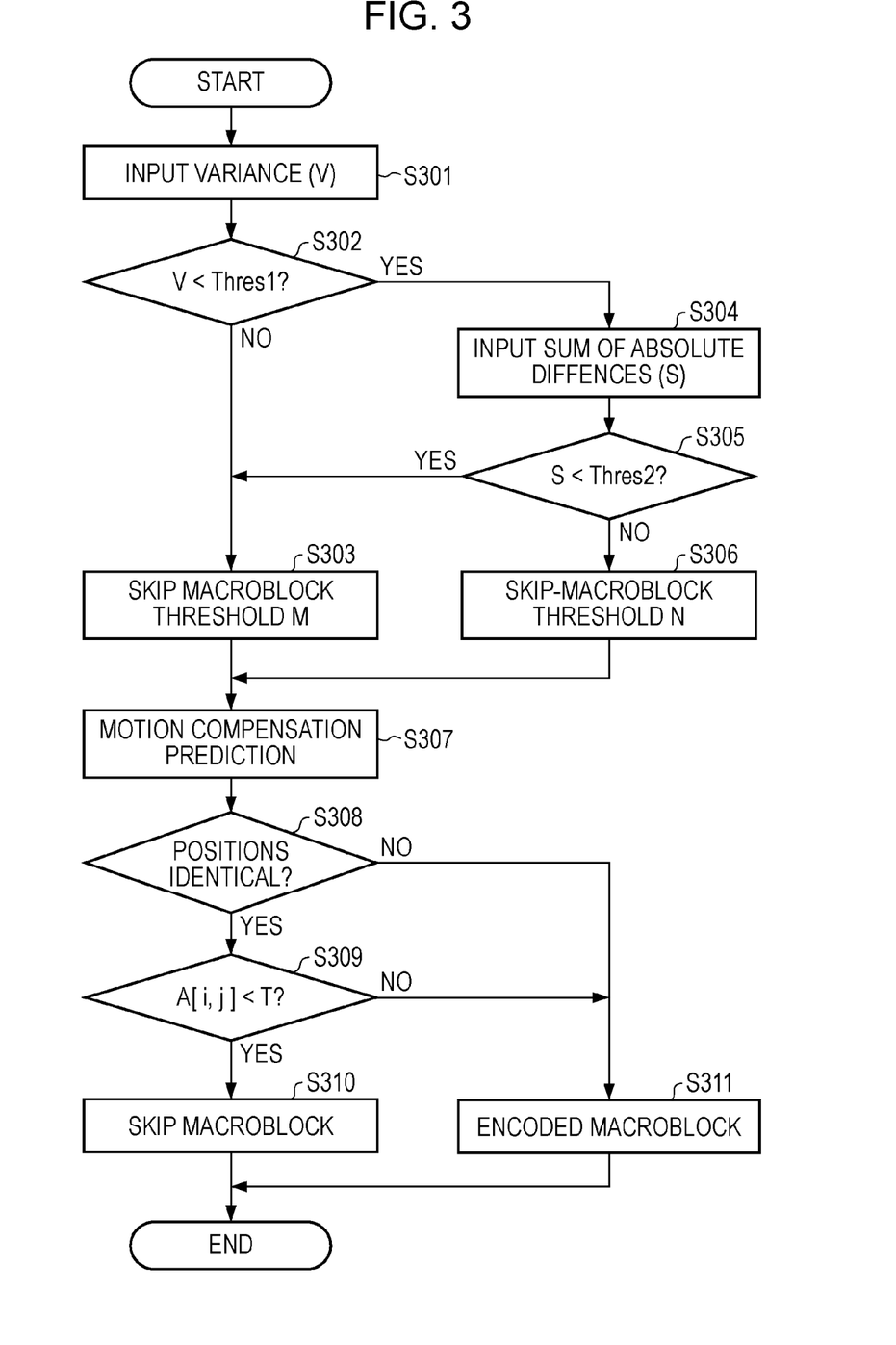
FIG. 3 is a flowchart showing the operation of a motion compensation prediction circuit according to the first embodiment.

The operation of the motion compensation prediction circuit 112 is next described with reference to a flowchart shown in FIG. 3.

In step S301, the motion compensation prediction circuit 112 receives a variance V of an encoding target block. The variance V is supplied from the block variance calculation circuit 102.

In step S302, the motion compensation prediction circuit 112 compares the input variance V with a first threshold value (Thres1) to determine whether or not the encoding target block is a low-frequency block.

If the comparison in step S302 indicates that the variance V is greater than the first threshold value, it is determined that the encoding target block is not a low-frequency block. In this case, in step S303, the motion compensation prediction circuit 112 sets a skip-macroblock threshold value T to a value M. The skip-macroblock threshold value T is used as a standard for determining whether or not an encoding target block is a skip macroblock.

If the calculation in step S302 indicates that the variance V is less than the first threshold value, it is determined that the encoding target block is a low-frequency block. In step S304, the motion compensation prediction circuit 112 receives the sum of absolute differences S supplied from the sum-of-absolute-difference calculation circuit 104.

In step S305, the motion compensation prediction circuit 112 compares the sum of absolute differences S with a second threshold value (Thres2) to determine whether or not the difference between the encoding target block and a block located at the corresponding position of the reference picture is small so that the encoding target block is regarded as a skip macroblock.

If it is determined in step S305 that the sum of absolute differences S is greater than the second threshold value, then in step S306 the motion compensation prediction circuit 112 sets the skip-macroblock threshold value T to a value N.

If it is determined in step S305 that the sum of absolute differences S is smaller than the second threshold value, then in step S303, the motion compensation prediction circuit 112 sets the skip-macroblock threshold value T to the value M.

The values M and N have a relationship represented by M<N. The threshold value T uses a quantization factor Q of an encoded macroblock preceding the current encoding target macroblock, and the values M and N are given by M=Q/2 (where M=1 in case of Q=1) and N=Q*2 (where N is at maximum equal to the maximum value of quantization factor Q) respectively.

Figure 2:
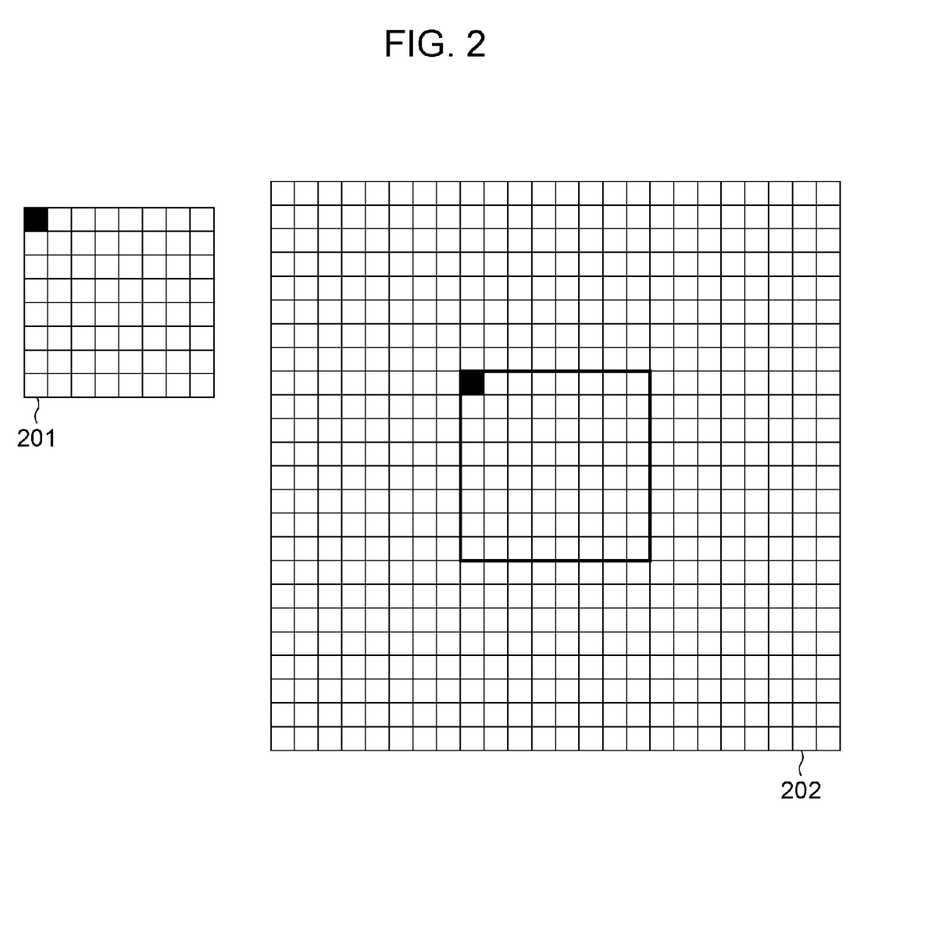
FIG. 2 is a diagram showing a macroblock and a search area.

In step S307, the motion compensation prediction circuit 112 calculates a motion vector of the encoding target block. FIG. 2 shows an encoding target macroblock 201 and a search area 202 used to search for a reference macroblock from a reference picture in order to calculate a motion vector of the encoding target macroblock 201. In the first embodiment, a macroblock has a size of eight by eight pixels, and a search area has a size of 24 by 24 pixels. The size of macroblock and search area may be arbitrarily changed. The motion compensation prediction circuit 112 performs equation (1) below on the basis of encoding target image data output from the frame rearrangement circuit 103 and reference image data output from the adder 110:

$$A[i,j]=\Sigma|C[x,y]-T[i+x,j+y]| \quad (1)$$

where C[x, y] represents a luminance signal of an encoding target macroblock and T[i+x, j+y] represents a luminance signal of a search area within a reference frame. The values x and y are determined by a macroblock address. The maximum of the values i and j is determined by the size of search area. In the first embodiment, each of the values i and j ranges from 0 to 24.

A predicted amount of code is calculated by using the quantization factor or the like of the reference macroblock from the value A[i, j] determined by equation (1), and an amount of vector code is generated from the vector of the reference macroblock and the values i and j. A position where the predicted amount of code and the amount of vector code are minimum is searched for.

In step S308, the motion compensation prediction circuit 112 determines whether the positions where the amount of code is minimum are identical in the encoding target macroblock and the reference macroblock. If both positions are not identical, it is determined that the encoding target macroblock is processed as a block to be encoded.

If it is determined in step S308 that both positions are identical, in step S309, the motion compensation prediction circuit 112 compares the value A[i, j] determined in step S307 with the skip-macroblock threshold value T. If the value A[i, j] is smaller than the skip-macroblock threshold value T, then in step S310 the motion compensation prediction circuit 112 processes the encoding target macroblock as a skip macroblock. If the value A[i, j] is greater than the skip-macroblock threshold value T, or if in step S308 it is determined that both positions are not identical, then in step S311 the motion compensation prediction circuit 112 processes the encoding target macroblock as a macroblock to be encoded.

According to the first embodiment, in the determination of a macroblock based on the value A[i, j] and the threshold value T, the threshold value T for a low-frequency block is increased to prevent or reduce the occurrence of a skip macroblock.

Therefore, the occurrence of creation of an unnatural looking image due to the presence of a macroblock that remains unchanged between frames, which is caused by skipping of encoding of a low-frequency macroblock, can be reduced.

Second Embodiment

A second embodiment of the present invention is next described with reference to the drawings. In the second embodiment, the determination of a skip macroblock described in the first embodiment is used in a quantization factor calculation circuit, by way of example.

Figure 4:
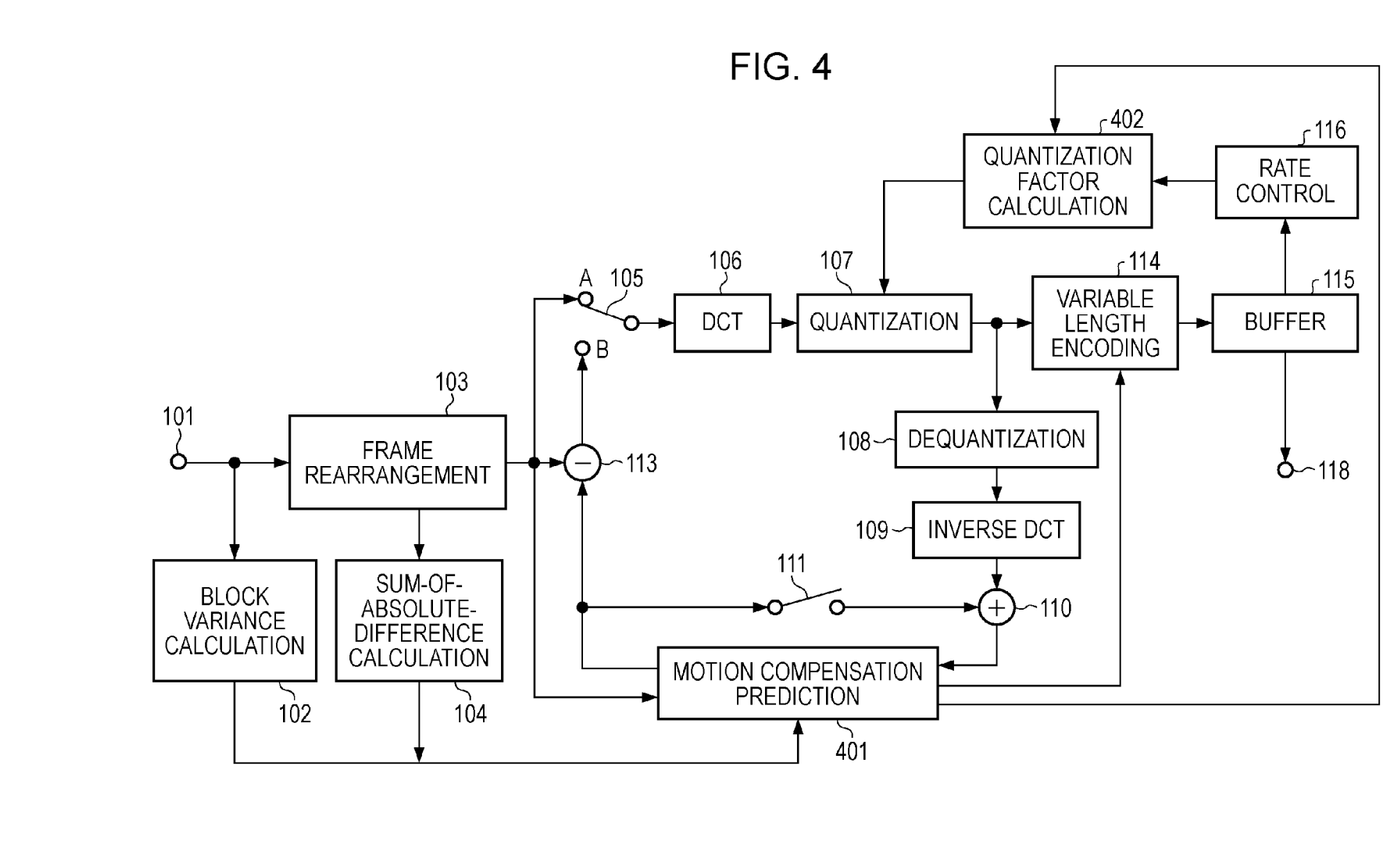
FIG. 4 is a schematic block diagram of an apparatus according to a second embodiment of the present invention.

FIG. 4 is a schematic block diagram of an apparatus according to the second embodiment of the present invention.

The apparatus of FIG. 4 uses the same components and interconnection as the apparatus of FIG. 1, except that the motion compensation prediction circuit 112 and the quantization factor calculation unit 117 of FIG. 1 are respectively replaced by a motion compensation prediction circuit 401 and a quantization factor calculation unit 402 in FIG. 4. The operation of components of the apparatus of the second embodiment, except for the motion compensation prediction circuit 401 and the quantization factor calculation unit 402, is the same as or alternatively similar to that of the first embodiment. The motion compensation prediction circuit 401 and the quantization factor calculation unit 402 respectively perform the same operations as the motion compensation prediction circuit 112 and the quantization factor calculation unit 117 of the first embodiment except as modified by the discussion provided below with reference to FIGS. 4 through 6.

Figure 5:
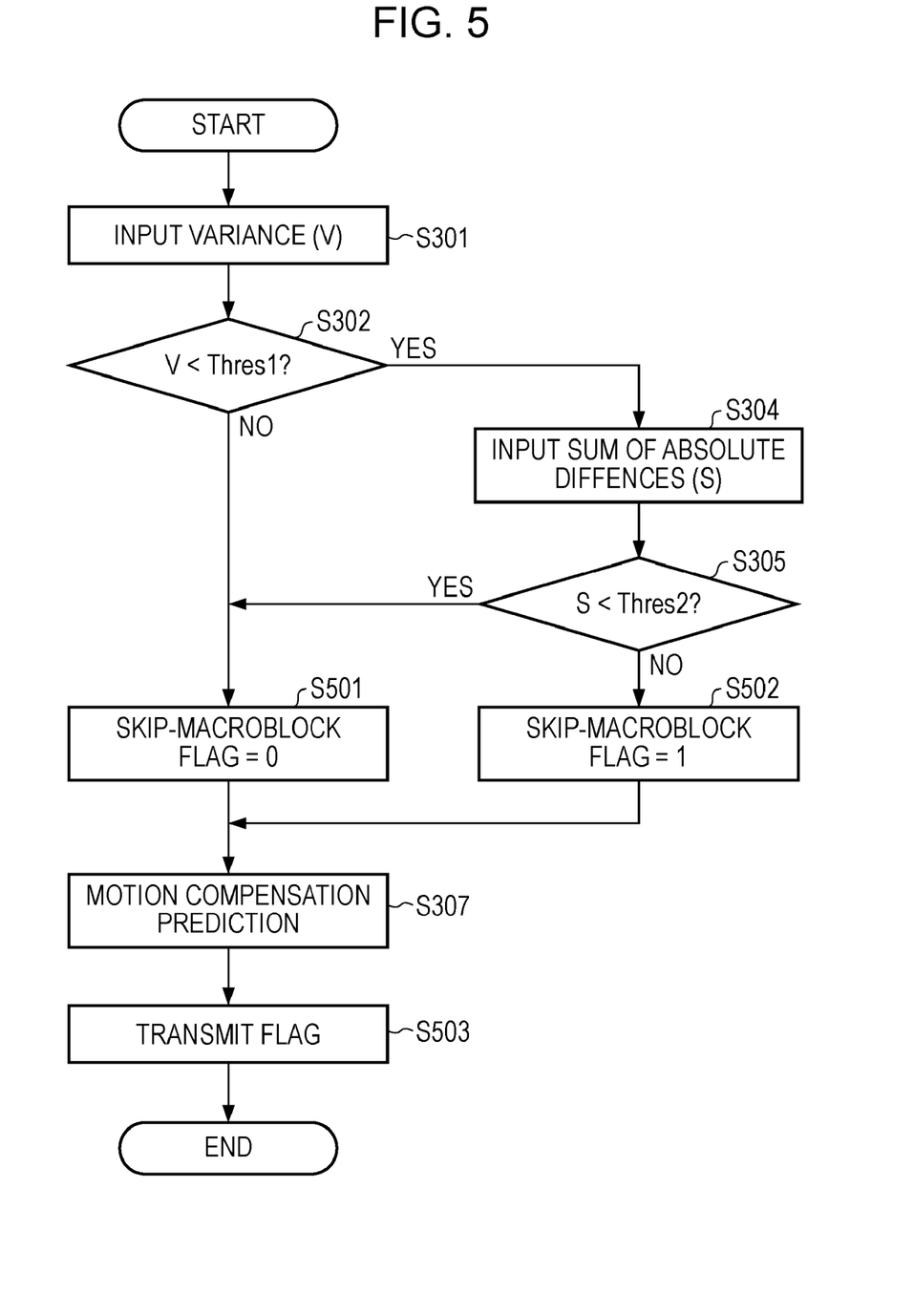
FIG. 5 is a flowchart showing the operation of a motion compensation prediction circuit according to the second embodiment.

FIG. 5 is a flowchart showing the operation of the motion compensation prediction circuit 401. The processing of steps S301, S302, S304, S305, and S307 is the same as that shown in FIG. 3.

If it is determined in step S302 that the variance V is greater than the first threshold value, then in step S501, the motion compensation prediction circuit 401 determines that the encoding target block is not a low-frequency block and sets a skip-macroblock flag to 0. Moreover, if it is determined in step S305 that the sum of absolute differences S is smaller than the second threshold value, then the processing of step S501 is performed.

If it is determined in step S305 that the sum of absolute differences S is greater than the second threshold value, then in step S502, the motion compensation prediction circuit 401 sets the skip-macroblock flag to 1.

In step S503, the motion compensation prediction circuit 401 transmits the set flag to the quantization factor calculation unit 402.

Figure 6:
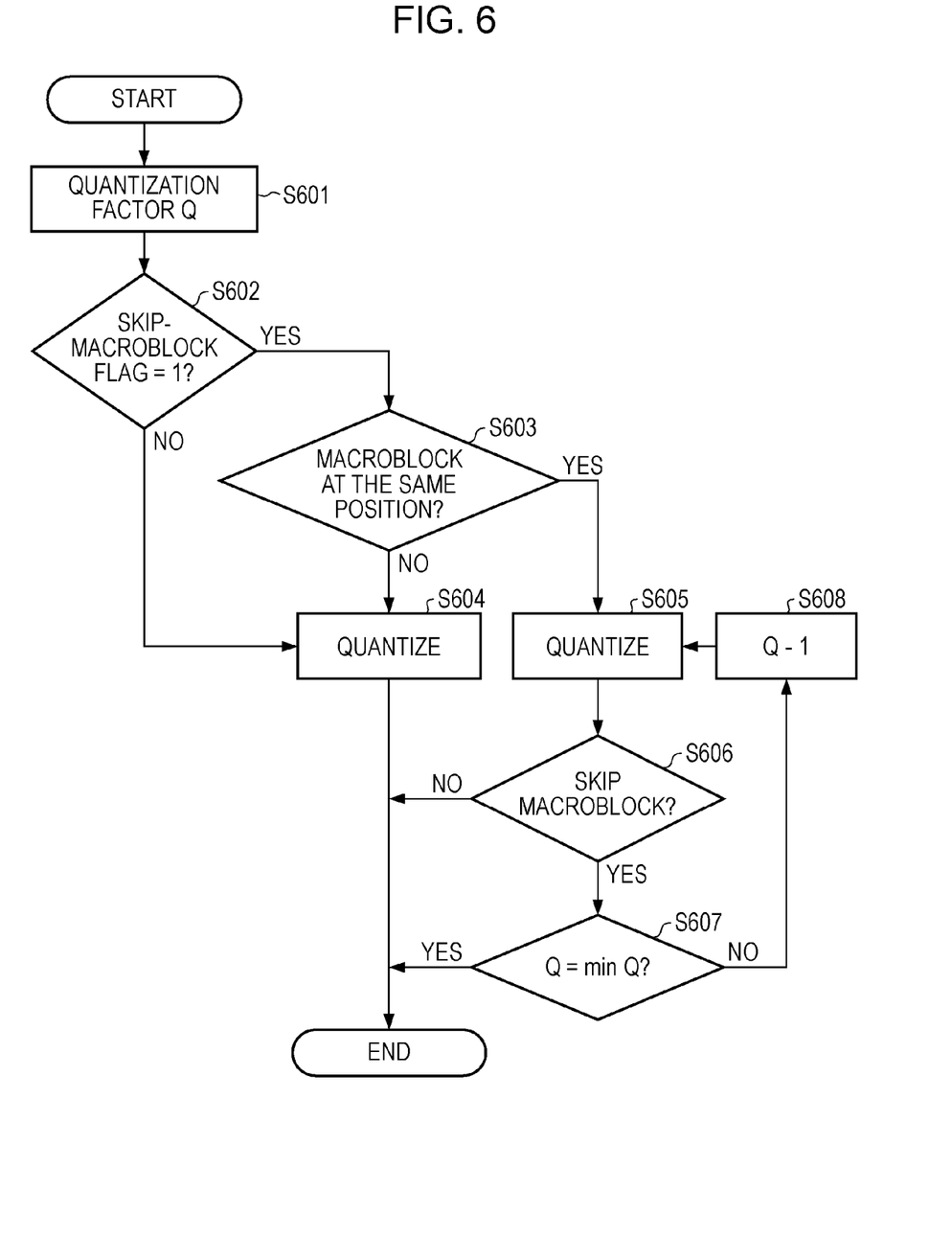
FIG. 6 is a flowchart showing the operation of a quantization factor calculation unit according to the second embodiment.

FIG. 6 is a flowchart showing the operation of the quantization factor calculation unit 402.

In the flowchart shown in FIG. 6, the operation of the quantization factor calculation unit 402 is shown in a case where the type of an encoding target picture is P-picture or B-picture.

In step S601, the quantization factor calculation unit 402 calculates a quantization factor Q.

The quantization factor Q is a value which is variable for each macroblock. The smaller the value of the quantization factor Q, the finer the quantization step. When the quantization factor Q is minimum, equal to zero, the compression ratio is minimum.

In step S602, the quantization factor calculation unit 402 determines whether or not the skip-macroblock flag supplied from the motion compensation prediction circuit 401 is 1.

If it is determined in step S602 that the skip-macroblock flag is 1, in step S603, the quantization factor calculation unit 402 determines whether or not a reference macroblock located at the same position as that of the encoding target macroblock is selected in the motion compensation prediction circuit 401.

If it is determined in step S603 that a macroblock located at the same position is not selected, in step S604, the quantization factor calculation unit 402 quantizes the encoding target block. If it is determined in step S603 that a macroblock located at the same position is selected, the quantization factor calculation unit 402 also quantizes the encoding target block (step S605).

In step S606, the quantization factor calculation unit 402 determines whether or not the encoding target macroblock is a skip macroblock on the basis of whether the skip-macroblock flag is 0 or 1.

If it is determined in step S606 that the encoding target macroblock is a skip macroblock, then in step S607, the quantization factor calculation unit 402 determines whether the quantization factor Q is minimum.

If it is determined in step S607 that the quantization factor Q is not minimum, then in step S608, the quantization factor calculation unit 402 reduces the quantization factor Q by one.

By performing the operation described above, the quantization factor calculation unit 402 can prevent or reduce the occurrence of a skip macroblock.

Therefore, the occurrence of creation of an unnatural looking image due to the presence of a macroblock that remains unchanged between frames, which is caused by skipping of encoding of a low-frequency macroblock, can be reduced.

Other Embodiments

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention may be implemented by the computer, the program code installed in the computer also implements the present invention. In other words, the present invention covers a computer program for the purpose of implementing the functions of the present invention. The computer may be, for example, a general purpose computer or a programmable video microprocessor.

So long as a system or apparatus can implement the functions of such a program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. A WWW (World Wide Web) server that downloads, to multiple users, the program files that implement the functions of the present invention by a computer is also covered by the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing a program read by a computer, an operating system or the like running on the computer may perform all or a part of the actual processing so that the functions of the foregoing embodiments can be implemented by such processing.

Furthermore, after such a program is read from a storage medium and written to a function expansion board inserted into a computer or to a memory provided in a function expansion unit connected to a computer, a CPU or the like mounted on the function expansion board or function expansion unit may perform all or a part of the actual processing so that the functions of the foregoing embodiments can be implemented by such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An encoding control apparatus for controlling encoding of a moving image in units of macroblocks, comprising:
   a variance calculation unit configured to calculate a variance of an encoding target macroblock;
   a sum-of-absolute-difference calculation unit configured to calculate a sum of absolute differences between the encoding target macroblock and a reference macroblock;
   a setting unit configured to set, based on the variance and the sum of absolute differences, a standard for determining whether to skip encoding of the encoding target macroblock;
   a prediction unit configured to perform motion compensation prediction on the encoding target macroblock to obtain a motion-compensated prediction value;
   a determination unit configured to determine whether to skip encoding of the encoding target macroblock by comparing the motion-compensated prediction value with the standard; and
   at least one programmable microprocessor configured to implement at least the variance calculation unit, the sum-of-absolute-difference calculation unit, and the setting unit;
   wherein the standard is different when the variance is smaller than a first threshold value and the sum of absolute differences is greater than a second threshold value than when the variance is greater than the first threshold value or the sum of absolute differences is smaller than the second threshold value.

2. The encoding control apparatus according to claim 1, wherein the second threshold value is greater than the first threshold value.

3. An encoding control apparatus for controlling encoding of a moving image in units of macroblocks, comprising:
- a variance calculation unit configured to calculate a variance of an encoding target macroblock;
- a sum-of-absolute-difference calculation unit configured to calculate a sum of absolute differences between the encoding target macroblock and a reference macroblock;
- a generation unit configured to generate, based on the variance and the sum of absolute differences, a standard indicating whether to encode the encoding target macroblock; and
- a control unit configured to control, based on the standard, a quantization factor for quantizing the encoding target macroblock; and
- at least one programmable microprocessor configured to implement at least the variance calculation unit and the sum-of-absolute-difference calculation unit;
- wherein the standard is different when the variance is smaller than a first threshold value and the sum of absolute differences is greater than a second threshold value than when the variance is greater than the first threshold value or the sum of absolute differences is smaller than the second threshold value.

4. An encoding control method for controlling encoding of a moving image in units of macroblocks, comprising:
- calculating a variance of an encoding target macroblock;
- calculating a sum of absolute differences between the encoding target macroblock and a reference macroblock;
- setting, based on the variance and the sum of absolute differences, a standard for determining whether to skip encoding of the encoding target macroblock;
- performing motion compensation prediction on the encoding target macroblock to obtain a motion-compensated prediction value; and
- determining whether to skip encoding of the encoding target macroblock by comparing the motion-compensated prediction value with the standard;
- wherein the standard is different when the variance is smaller than a first threshold value and the sum of absolute differences is greater than a second threshold value than when the variance is greater than the first threshold value or the sum of absolute differences is smaller than the second threshold value.

5. An encoding control method for controlling encoding of a moving image in units of macroblocks, comprising:
- calculating a variance of an encoding target macroblock;
- calculating a sum of absolute differences between the encoding target macroblock and a reference macroblock;
- generating, based on the variance and the sum of absolute differences, a standard indicating whether to skip encoding of the encoding target macroblock; and
- controlling, based on the information, a quantization factor for quantizing the encoding target macroblock;
- wherein the standard is different when the variance is smaller than a first threshold value and the sum of absolute differences is greater than a second threshold value than when the variance is greater than the first threshold value or the sum of absolute differences is smaller than the second threshold value.

6. A non-transitory computer-readable storage medium having a program stored thereon, the program capable of causing a computer to execute the encoding control method according to claim 4.

7. A non-transitory computer-readable storage medium having a program stored thereon, the program capable of causing a computer to execute the encoding control method according to claim 5.

8. An encoding control apparatus for encoding a moving image in units of macroblocks, comprising:
- a variance calculation unit configured to calculate a variance of an encoding target macroblock;
- a sum-of-absolute-difference calculation unit configured to calculate a sum of absolute differences between the encoding target macroblock and a reference macroblock;
- a determining unit configured to determine whether the encoding target macroblock is a skip macroblock based on a standard; and
- at least one programmable microprocessor configured to implement at least the variance calculation unit and sum-of-absolute-difference calculation unit;
- wherein the standard used by the determining unit for determining whether the encoding target macroblock is a skip macroblock is different when the variance is smaller than a first threshold value and the sum of absolute differences is greater than a second threshold value than when the variance is greater than the first threshold value or the sum of absolute differences is smaller than the second threshold value.

* * * * *